Feb. 16, 1926.

L. GIZIENSKI

WELDING PROCESS

Filed April 2, 1925

1,572,921

Inventor
L. Gizienski
By B. Pelechowicz
Attorney

Patented Feb. 16, 1926.

1,572,921

UNITED STATES PATENT OFFICE.

LAWRENCE GIZIENSKI, OF CURTISVILLE, PENNSYLVANIA.

WELDING PROCESS.

Application filed April 2, 1925. Serial No. 20,089.

*To all whom it may concern:*

Be it known that I, LAWRENCE GIZIENSKI, a citizen of the United States of America, residing at Curtisville, in the county of Allegheny and State of Pennsylvania, have invented certain new and useful Improvements in Welding Processes, of which the following is a specification.

This invention relates to an improved method for joining ends of rods, bars, or the like.

The primary object of this invention is to provide an improved method of welding spliced or otherwise joined ends of rods or bars, which may be formed of copper of other analogous metal.

Other objects and advantages of the invention will be apparent during the course of the following description.

Figure 1:
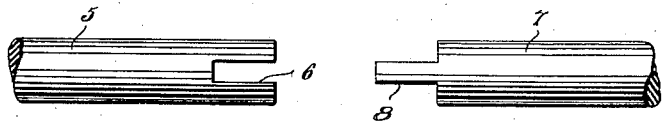
Figure 2:
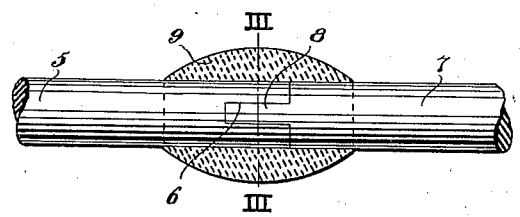
Figure 3:
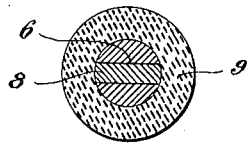

In the accompanying drawing forming a part of this specification and in which like numerals are employed to designate like parts throughout the same, Figure 1 is an elevational view of a pair of rod ends which are properly shaped to form a splice or joint, Figure 2 shows the said rod ends spliced or joined together and enclosed in a case or layer of clay, or other similar plastic material capable of standing intense heat, and Figure 3 is a transverse sectional view taken upon line III—III of Fig. 2.

In the drawing, wherein for the purpose of illustration is shown a preferred embodiment of this invention, the numeral 5 designates the end portion of a rod having formed therein the transversely extending slot or cut 6. The reference numeral 7 designates a second rod end which is formed with a transversely extending tongue 8 of substantially equal dimensions to the slot or cut 6 formed in the rod end 5.

It will now be seen that a mortise and tenon joint or splice has been formed and that by locating the tongue 8 within the slot or cut 6, the rod ends 5 and 7 will be spliced together, as best illustrated in Figs. 2 and 3.

To permit the bringing of the joined portion of the rod ends 5 and 6 to a welding temperature, by subjecting the said ends to an intense heat, without causing diminution or oxidation of the spliced portions, the said splice is enclosed or encased in a layer of clay 9 or other similar plastic material capable of withstanding intense heat. After the spliced ends have been brought to a welding temperature, the clay layer 9 is quickly removed and the joined or spliced ends of the rods 5 and 6 welded.

It is understood that mortise and tenon joint has a preference over any other form of joint for the reason that a mortise and tenon joint affords a greater area of contacting surfaces at the ends of the rods to be joined.

Having thus described the invention, I claim:—

1. The process of welding rod ends and preventing oxidation of the surfaces to be welded, consisting in first coupling the two ends in relatively permanent engaging position, incasing said ends in a protective covering, heating the whole to welding temperature, removing the covering, and finally welding the ends together without displacing them from their original coupled position.

2. The process of welding rods and preventing oxidation of the surfaces to be welded, consisting in providing the ends of the rods with relatively cooperative elements designed to interengage, then interengaging said elements in a relatively permanent position with their meeting surfaces disposed in a plane coincident with the longitudinal axes of the rods, encasing the joint thus formed in a protective covering, heating the encased joint to a welding temperature, removing the protective covering, and then welding the joint without relatively displacing the interlocking elements whereby to prevent oxidation of said elements subsequent to removal of the protective covering.

In testimony whereof I affix my signature.

LAWRENCE GIZIENSKI.